United States Patent
Ivanov et al.

(10) Patent No.: US 9,304,804 B2
(45) Date of Patent: Apr. 5, 2016

(54) REPLICATING VIRTUAL MACHINES ACROSS DIFFERENT VIRTUALIZATION PLATFORMS

(71) Applicant: VMware, Inc., Palo Alto, CA (US)

(72) Inventors: Ivan Ivanov, Sofia (BG); Ivan Velevski, Sofia (BG)

(73) Assignee: VMware, Inc., Palo Alto, CA (US)

( * ) Notice: Subject to any disclaimer, the term of this patent is extended or adjusted under 35 U.S.C. 154(b) by 144 days.

(21) Appl. No.: 14/053,147

(22) Filed: Oct. 14, 2013

(65) Prior Publication Data

US 2015/0106802 A1    Apr. 16, 2015

(51) Int. Cl.
G06F 9/455    (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 5,983,293 A * | 11/1999 | Murakami | 710/56 |
| 7,447,854 B1 * | 11/2008 | Cannon | 711/162 |
| 8,141,075 B1 * | 3/2012 | Chawla et al. | 718/1 |
| 2010/0107158 A1 * | 4/2010 | Chen | G06F 11/1438 718/1 |
| 2011/0022574 A1 * | 1/2011 | Hansen | G06F 11/2097 707/698 |
| 2012/0047501 A1 * | 2/2012 | Box | G06F 9/45533 718/1 |
| 2012/0072393 A1 * | 3/2012 | Kumar et al. | 707/634 |

* cited by examiner

*Primary Examiner* — Meng An
*Assistant Examiner* — James J Lee
(74) *Attorney, Agent, or Firm* — Patterson & Sheridan LLP

(57) ABSTRACT

A first virtual machine executing in a first computer server is replicated to a second virtual machine executing in a second computer server, which is connected to the first computer server over a network. Virtual disks of the first virtual machine are transmitted to the second server, where each transmitted virtual disk corresponds to one of the virtual disks of the second virtual machine, the virtual disks of the first virtual machine having a format different from the format of the virtual disks of the second virtual machine. A plurality of updates to the virtual disks of the first virtual machine is captured, and contiguous data blocks from the virtual disks of the first virtual machine that are subject to the captured updates are identified. The identified contiguous data blocks are then transmitted to the second server for storage in the virtual disks of the second virtual machine.

20 Claims, 10 Drawing Sheets

REPLICATING VIRTUAL MACHINES ACROSS DIFFERENT VIRTUALIZATION PLATFORMS

BACKGROUND

The use of virtualization software technology has become widespread. Virtualized computing environments are no longer limited to large corporate and governmental enterprises. Indeed, virtualized computing environments are being used more frequently in small- and medium-sized businesses, where virtualized computing has enabled, for example, consolidation of data center operations. Whereas, in the past, a large number of physical computing machines were required to satisfy the computing needs of an enterprise, at present, far fewer physical computing resources are required. Instead, physical computing machines are being increasingly replaced by virtual machines.

An important aspect of managing virtualized computing environments is the ability to replicate virtual machines. Virtual machine replication is important because it enables, among other things, data center migration, software distribution, and disaster recovery. In VMware computing platforms, virtual machine replication and migration is performed utilizing a software component, referred to as a filter driver, which is installed on a source host computer. The filter driver captures virtual disk file updates (i.e., write operations to virtual disk files) that are generated by virtual machines executing on the source computer for transmission to one or more target computers. A target computer accepts the virtual disk file updates from the source host and applies them to its own file system. Such a process enables synchronization of virtual machines running on source and target computers.

As virtualized environments have become more and more pervasive in enterprise computing environments, several software vendors have developed offerings in the field. Indeed, several vendors have developed their own proprietary "hypervisor," which is the system software component that makes virtualized computing possible. Many enterprises currently utilize a single vendor offering in order to support a virtualized computing environment. However, as mergers and consolidations occur in the business world, a need has arisen to support enterprise-wide virtualized computing in heterogeneous, multi-vendor (i.e., multi-hypervisor) environments. An aspect of such support is the ability to manage multi-hypervisor environments using a single, unified platform. Further, as virtual machine replication has become increasingly important, the ability to replicate virtual machines in a heterogeneous virtualized computing environment has surfaced as an important problem to be solved. Of special interest is the ability to replicate virtual machines in heterogeneous virtual computing environments that include servers running the VMware's hypervisor and the Microsoft's hypervisor, because these two are the two most widely used hypervisors.

SUMMARY OF THE DISCLOSURE

One or more embodiments provide a method of replicating virtual machines between first and second computer servers that are connected over a network and are each connected to one or more disk storage units that are capable of storing files in a file system. The method includes the steps of transmitting virtual disks of a first virtual machine running in the first server to the second server, wherein each transmitted virtual disk is stored as a file in a storage unit connected to the second server and corresponds to one of a plurality of virtual disks of a second virtual machine running in the second server, and wherein the virtual disks of the first virtual machine have a first format and the virtual disks of the second virtual machine have a second format. The method further includes capturing a plurality of updates to the virtual disks of the first virtual machine and identifying contiguous data blocks in the virtual disks of the first virtual machine that are subject to the captured updates, and transmitting the identified contiguous data blocks to the second server for storage in the virtual disks of the second virtual machine.

Further embodiments include a non-transitory computer readable medium that includes instructions that enable a processing unit to implement one or more aspects of the above method, as well as a computer system configured to implement one or more aspects of the above method.

DETAILED DESCRIPTION

Figure 1:
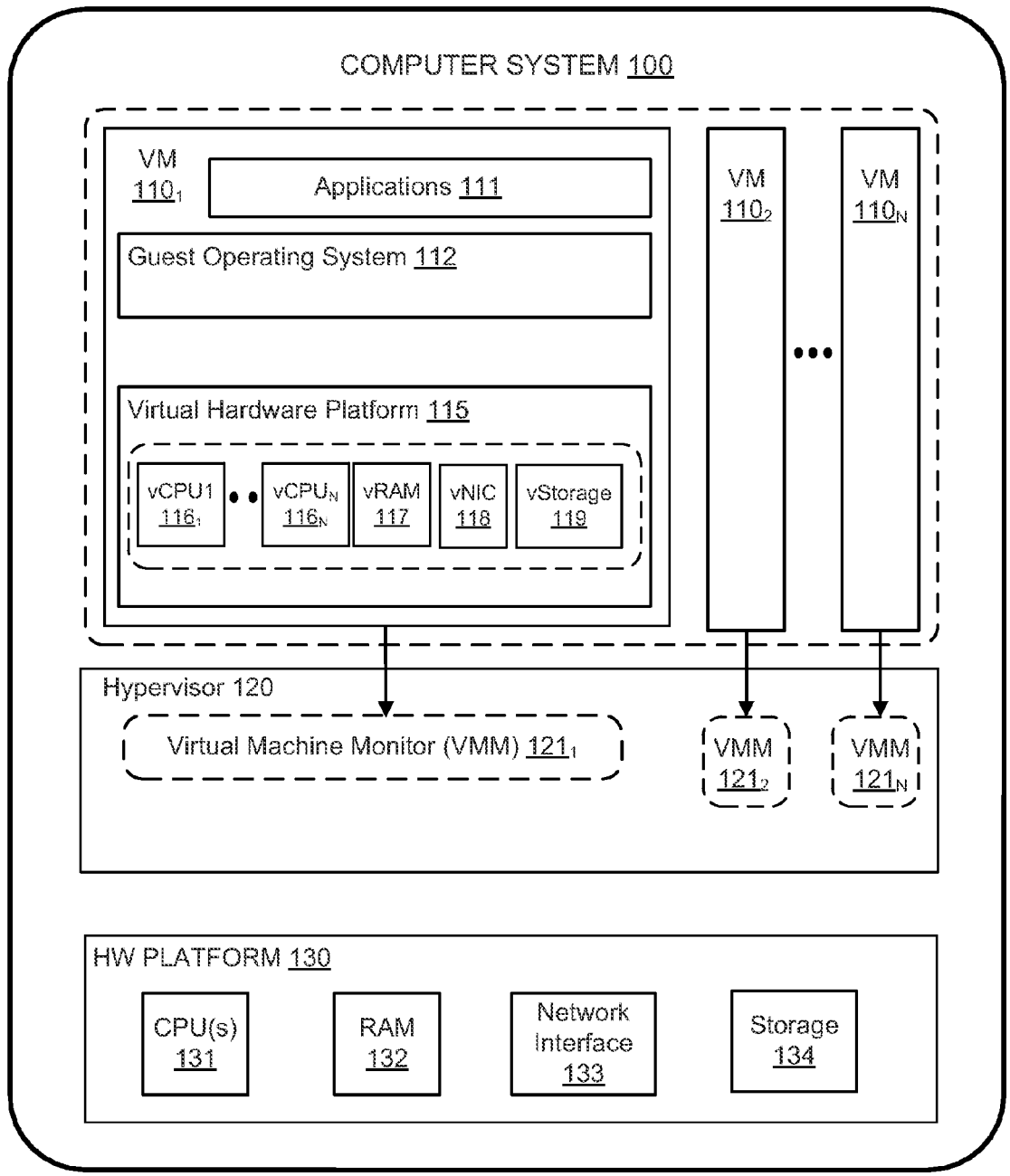
FIG. 1 is a block diagram that depicts a computer system that realizes a virtualized computing architecture in which embodiments may be implemented.

FIG. 1 depicts a block diagram of a computer system 100 that is representative of a general virtualized computer architecture in which embodiments may be implemented. As is illustrated, computer system 100 hosts multiple virtual machines (VMs) $110_1$-$110_N$ that run on and share a common hardware platform 130. Hardware platform 130 includes conventional computer hardware components, such as one or more central processing units (CPUs) 131, random access memory (RAM) 132, one or more network interfaces 133, and an interface to a persistent storage 134.

In some embodiments, a virtualization software layer, referred to as a hypervisor 120, is installed on top of hardware platform 130. Hypervisor 120 makes possible the concurrent instantiation and execution of one or more VMs $110_1$-$110_N$. The interaction of a VM 110 with hypervisor 120 is facilitated by a virtual machine monitor (VMM) 121. Each VMM $121_1$-$121_N$ is assigned to and monitors a corresponding VM $110_1$-$110_N$. In one particular embodiment, hypervisor 120 may be an ESX® hypervisor, which is implemented as a commercial product in VMware's vSphere® virtualization product, available from VMware Inc. of Palo Alto, Calif. In another embodiment, hypervisor 120 may be a Hyper-V® hypervisor, which is commercially available from Microsoft Corp. of Redmond, Wash. In alternative embodiments, a host operating system is installed between hypervisor 120 and hardware platform 130. In such an embodiment, hypervisor 120 operates above an abstraction level provided by the host operating system.

After instantiation, each VM $110_1$-$110_N$ encapsulates a physical computing machine platform that is executed under the control of hypervisor 120. Virtual devices of a VM 110 are embodied in the virtual hardware platform 115, which is comprised of, but not limited to, one or more virtual CPUs (vCPUs) $116_1$-$116_N$, a virtual random access memory (vRAM) 117, a virtual network interface adapter (vNIC) 118, and virtual disk storage (vStorage) 119. Virtual hardware platform 115 supports the installation of a guest operating system (guest OS) 112, which is capable of executing applications 111. Examples of a guest OS 112 include any of the well-known commodity operating systems, such as Microsoft Windows, Linux, and the like.

The virtual disk storage 119 of a VM 110 comprises one or more virtual disks (vDisks). From the viewpoint of a VM 110, each of the vDisks appears as an actual, physical disk device capable of storing user files, system files, and, for those guest operating systems 112 that support virtual memory, memory pages. However, from the point of view of a hypervisor 120, the vDisks of each of the VMs 110 are maintained as physical files on a physical storage device that hypervisor 120 accesses through storage interface 134. In some embodiments, the vDisks may be implemented as .vmdk files, which is an internal structure that is used in vSphere® computing environments. In other embodiments, the vDisks may be implemented using the VHDX format, also referred to herein as ".vhdx files." Files that implement the VHDX format have an internal structure that is used in Hyper-V® computing environments.

It should be recognized that the various terms, layers, and categorizations used to describe the components in FIG. 1 may be referred to differently without departing from their functionality or the spirit or scope of the disclosure. For example, VMMs $121_1$-$121_N$ may be considered separate virtualization components between VMs $110_1$-$110_N$ and hypervisor 120 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 115 may be merged with and into VMM 121.

Figure 2:
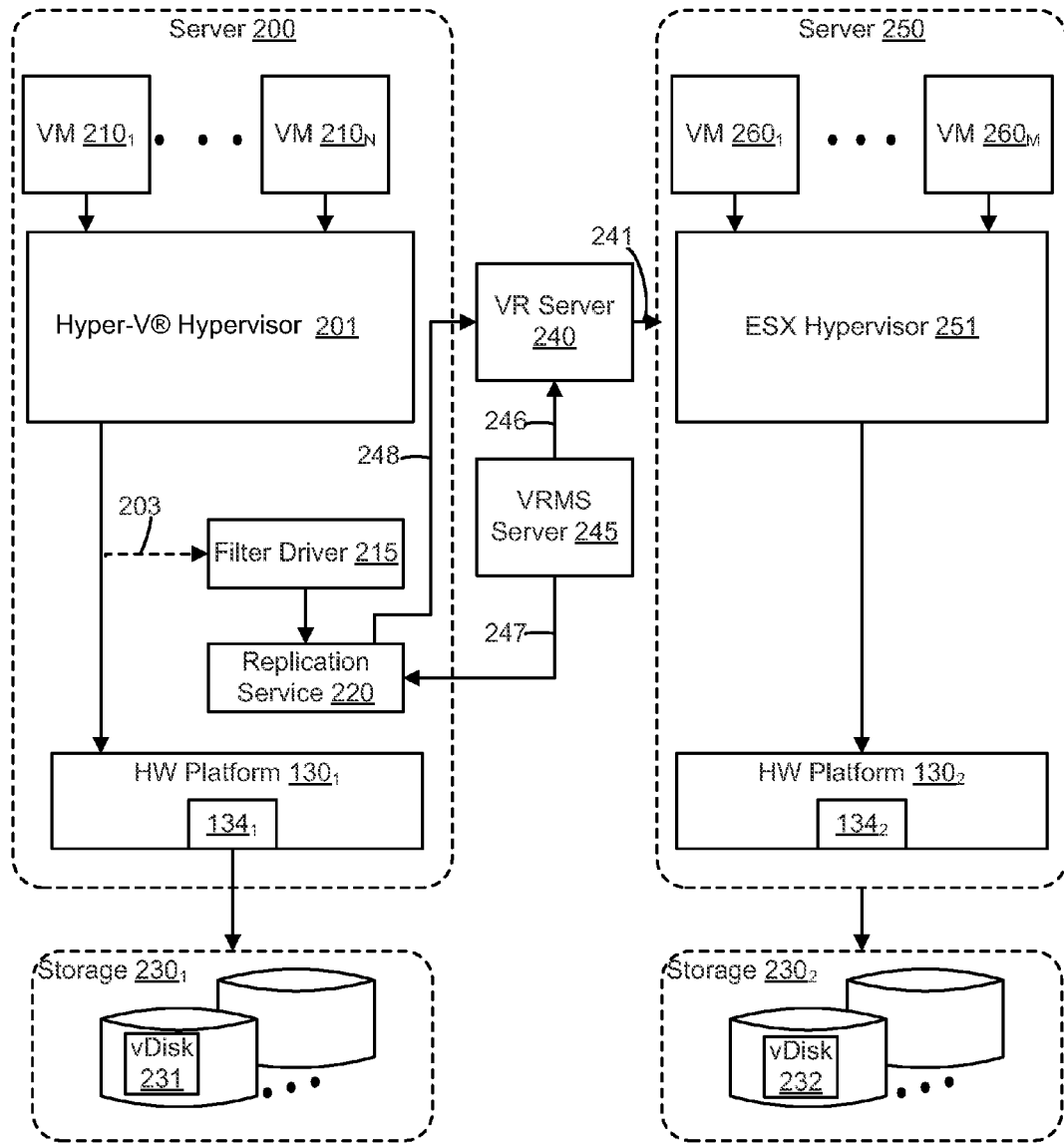
FIG. 2 is a block diagram that illustrates a source server and a target server configured for replication of virtual machines.

FIG. 2 is a block diagram that depicts a system of computer servers in which embodiments may be implemented. The system includes a server 200 in which a Hyper-V® hypervisor 201 is implemented to enable concurrent execution of VMs 210 in server 200. Similar to the VMs 110 depicted in FIG. 1, each of the VMs 210 includes a guest operating system (OS) that, in turn, supports the running of one or more guest applications under its control. As depicted in FIG. 2, hypervisor 201 runs on top of hardware platform $130_k$, which comprises one or more CPUs 131, a system random access memory (RAM) 132, and a network interface controller (NIC) 133 (not shown). Further, hardware platform $130_1$ contains an interface $134_1$ to external storage $230_1$. As shown storage $230_1$ may comprise one or more physical disk devices. In addition, storage $230_1$ may comprise a storage array (for example, a Redundant Array of Inexpensive Disks, or "RAID" array), or a storage area network (SAN) comprising multiple physical storage units connected to one another. Storage $230_1$ may be implemented using optical storage media, magnetic disk media, flash memory, and other types of persistent storage devices.

Each of VMs 210 implements a virtual hardware platform, which includes one or more virtual disks (vDisks). The vDisks for each of VMs 210 contain both user application and guest OS files. While vDisks appear as actual physical disks from the point of view of the guest OS that runs within each VM 210, vDisks are viewed and accessed as files by hypervisor 201. That is, from the viewpoint of hypervisor 201, each vDisk is stored as a vDisk file 231 on storage $230_1$. When a particular VM 210 performs a write operation to a guest file on a virtual disk, the hypervisor 201 receives the write request from the virtual hardware interface of the particular VM 210, and proceeds to perform the write operation to the corresponding vDisk file 231.

Referring to FIG. 2, the system depicted also includes a server 250 in which an ESX® hypervisor 251 is implemented to enable concurrent execution of VMs 260 in server 250. Similar to hypervisor 201, hypervisor 251 runs on top of a hardware platform $130_2$, which includes one or more CPUs 131, a system random access memory (RAM) 132, and a NIC 133 (not shown). In addition, hardware platform $130_2$ includes a storage interface $134_2$, which enables ESX hypervisor 251 to access physical storage $230_2$. Similar to the function performed by hypervisor 201, hypervisor 251 controls access to hardware platform $130_2$ for VMs 260.

Continuing with FIG. 2, storage $230_2$, which is connected to server 250 via storage interface $134_2$, may be a single disk unit, a storage array, a RAID array, or several storage units connected in a storage area network. Hypervisor 251 controls and coordinates access to storage $230_2$ for VMs 260. That is, hypervisor performs reading and writing of data from and to storage $230_2$ in response to read and write requests issued by VMs 260.

Similar to VMs 210, each of VMs 260 store data in virtual disks (vDisks). The virtual disks of a VM 260 contain all data files used by the guest applications 111, as well as the guest operating system files used by guest OS 112, for each VM 260. As is the case for the Hyper-V® platform, vDisks for each of VMs 260 is stored in a corresponding VM disk file 232 stored in storage $230_2$. However, the formats (i.e., the internal structure) of the VM disk files 231 are different from the formats of the VM disk files 232.

Filter driver 215 also runs on Hyper-V® server 200. Filter driver 215 is a software component that runs as a kernel level process, at the same system level as hypervisor 201. Filter driver 215 has visibility to the actual physical hardware platform $130_1$ on server 200, as opposed to the abstracted virtual hardware platform that is visible to VMs 210. The primary function of filter driver 215 is to intercept and track all physical write operations (i.e., updates) to files stored in storage $230_1$. This interception is depicted in FIG. 2 as communication link 203. In other words, every time hypervisor 201 performs a physical write operation to a file that is stored storage $230_1$ filter driver 215 records the write operation in a data structure, which in some embodiments is stored in system RAM 132. In one embodiment, this data structure comprises a list, where each list entry corresponds to one file write operation (or file update), and where each entry comprises a file identifier (or address), an offset within the file (usually expressed in blocks), and a size (also usually expressed in blocks). In embodiments, the file identifier may be the fully qualified path name of the updated file. In other embodiments, the file identifier may be the block address of the file on a persistent storage device that is a component of storage $230_1$.

In some cases, the file updates performed by hypervisor 201 relate to write operations that a VM 210 issues. That is, a VM 210 writes to a file in virtual disk storage by issuing write commands to one of its virtual disks. As mentioned earlier, from the point of view of hypervisor 201, virtual disks are stored as physical files in storage $230_1$. In other cases, hypervisor 201 performs write operations to files stored in storage $230_1$ in order to perform various system tasks on its own behalf, such as updating configuration files, updating access control data, and the like. Regardless of the type of file update performed by hypervisor 201, filter driver 215 intercepts, captures, and records the file update.

Replication service 220 is a user-level process, as opposed to a kernel-level process, which runs in server 200 and communicates with filter driver 215. Replication service 220 executes external to VMs 210 executing on Hyper-V® server 200 and has access to hardware platform 130 and storage $230_1$. In embodiments, replication service 220 is configured to periodically send a message to filter driver 215. The frequency with which replication service 220 communicates with filter driver 215 may be set in a configuration file, or may be specified interactively by a system administrator. When filter driver 215 receives the message from replication service 220, filter driver 215 communicates all physical file updates captured since a prior point in time that file updates were communicated to replication service 220. In the case where filter driver 215 receives a first message from replication service 220, filter driver 215 communicates all file updates captured since filter driver 215 started capturing file updates. After communicating a list of file updates to replication service 220, embodiments of filter driver 215 clears a data structure in which those write operations are stored. This has the salutary effect of preventing filter driver 215 from re-communicating the same file updates in response to a subsequent request.

Figure 4:
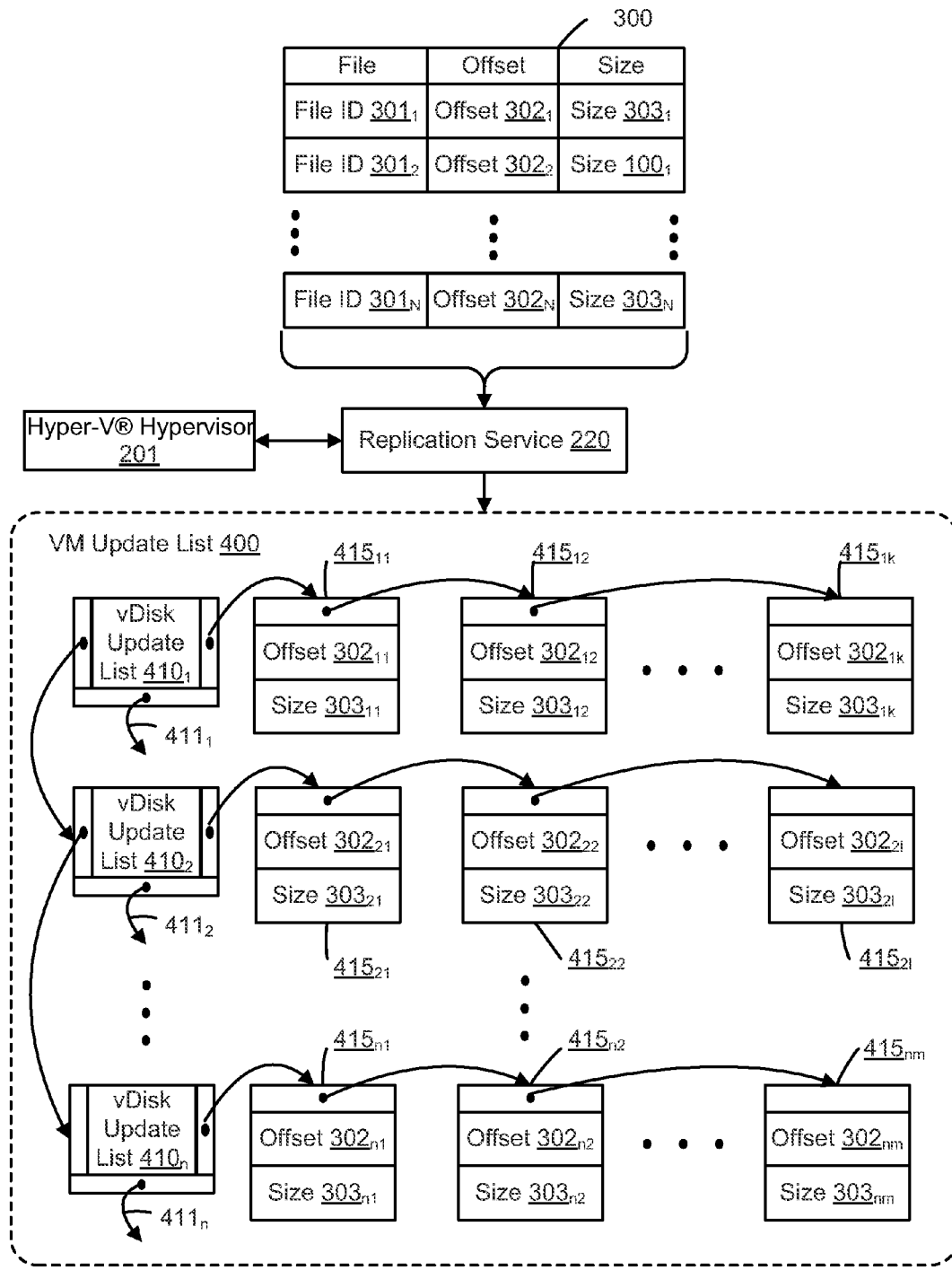
FIG. 4 is a block diagram that depicts the receipt and organization of virtual machine file updates by a replication service according to embodiments.

Replication service 220, after it receives the set of file updates from filter driver 215, makes a determination as to which of the file updates correspond to a virtual disk of VM 210 (i.e., VM disk file 231). Once a received file update is determined to have been issued to a particular VM disk file 231, embodiments of replication service 220 store two data elements in a list created for the vDisk 231: (1) the block offset of the write operation; and (2) the number of blocks that correspond to the write operation. An embodiment of such a list is depicted in FIG. 4. Once replication service 220 determines all of the file updates captured by filter driver 215 that pertain to a VM disk file 231, replication service 220 transmits the file updates (i.e., the blocks of the files that have been changed by the update) to server 250, via VR server 240. In one or more embodiments, replication service 220 maintains the file updates in the list created for vDisk 231 prior to transmitting the file updates to server 250. In such embodiments, replication service 220 maintains a timer for VM 210, which is set to expire after a predetermined and configurable time interval. The interval for the timer maintained for VM 210 is, in general, longer than the periodic interval that replication service 220 communicates with filter driver 215. This results in file updates being communicated from filter driver 215 to replication service 220 more frequently than file updates are transmitted to server 250. Such an embodiment has the advantage of saving kernel memory, because filter driver 215 maintains file updates in kernel memory, while replication service 220 maintains virtual disk updates in user memory, which is usually available in greater abundance. Further, in some embodiments, when the timer of VM 210 expires, the list created for vDisk 231 is saved, a new list is allocated to continue receiving file updates from filter driver 215, and the saved list is used to locate and transmit the file updates to server 250. Additionally, one or more embodiments support the configuration of a replication interval for each VM. Thus, for example, a mission critical, time-sensitive VM may be replicated on a more frequent basis than other, less critical VMs. In other cases, VMs that generate numerous virtual disk writes can be scheduled to replicate less frequently so as to conserve network bandwidth.

VR server 240 may be implemented as a virtual machine running in server 251 or may run implemented as a physical machine. VR server 240 accepts the file updates transmitted by replication service 220 and, in turn, communicates those file updates to server 250. In some embodiments, replication service 220 communicates with VR server 240 using the Light Weight Delta (LWD) protocol, a data protocol used in VMware's vSphere® environments for efficient transfer of data changes as depicted by communication link 248 in FIG. 2. VR server 240, in turn, communicates with server 250 in order to transmit the file updates to server 250, where the updates are saved to target VM disk files 232, which are the virtual disks of the target VMs 260.

Still referring to FIG. 2, a vSphere® Replication Management (VRMS) server 245 is also included. In embodiments VRMS 245 runs as a virtual machine or virtual appliance in an ESX server. VRMS server 245 orchestrates the process of replication of source VMs 210 to corresponding target VMs 260. VRMS server 245 communicates with both replication service 220 and VR server 240 using, in some embodiments, the VMware Managed Object Design Language (or VMODL) protocol. This communication is depicted, respectively, by links 247 and 246. VRMS server 245 operates under the control of a system administrator, enabling the system administrator to centrally manage replication of virtual machines across host computers.

In some embodiments, the components of FIG. 2, namely, server 200, server 250, VR server 240, and VRMS server 245 are connected to each other over a local area network. Supported local area network configurations included, but are not limited to, token ring, token bus, and Ethernet. In other embodiments, the components of FIG. 2 are connected in a campus-area or metropolitan-area network. In still other embodiments, the components of FIG. 2 are connected over a wide-area network (such as the Internet). Further, some components (such as VR server 240, VRMS server 245, and server 250) may run on the same physical computer. In addition, embodiments may be implemented using a mixture of the aforementioned network configurations. All such configurations are within the scope of the present invention.

Figure 3:
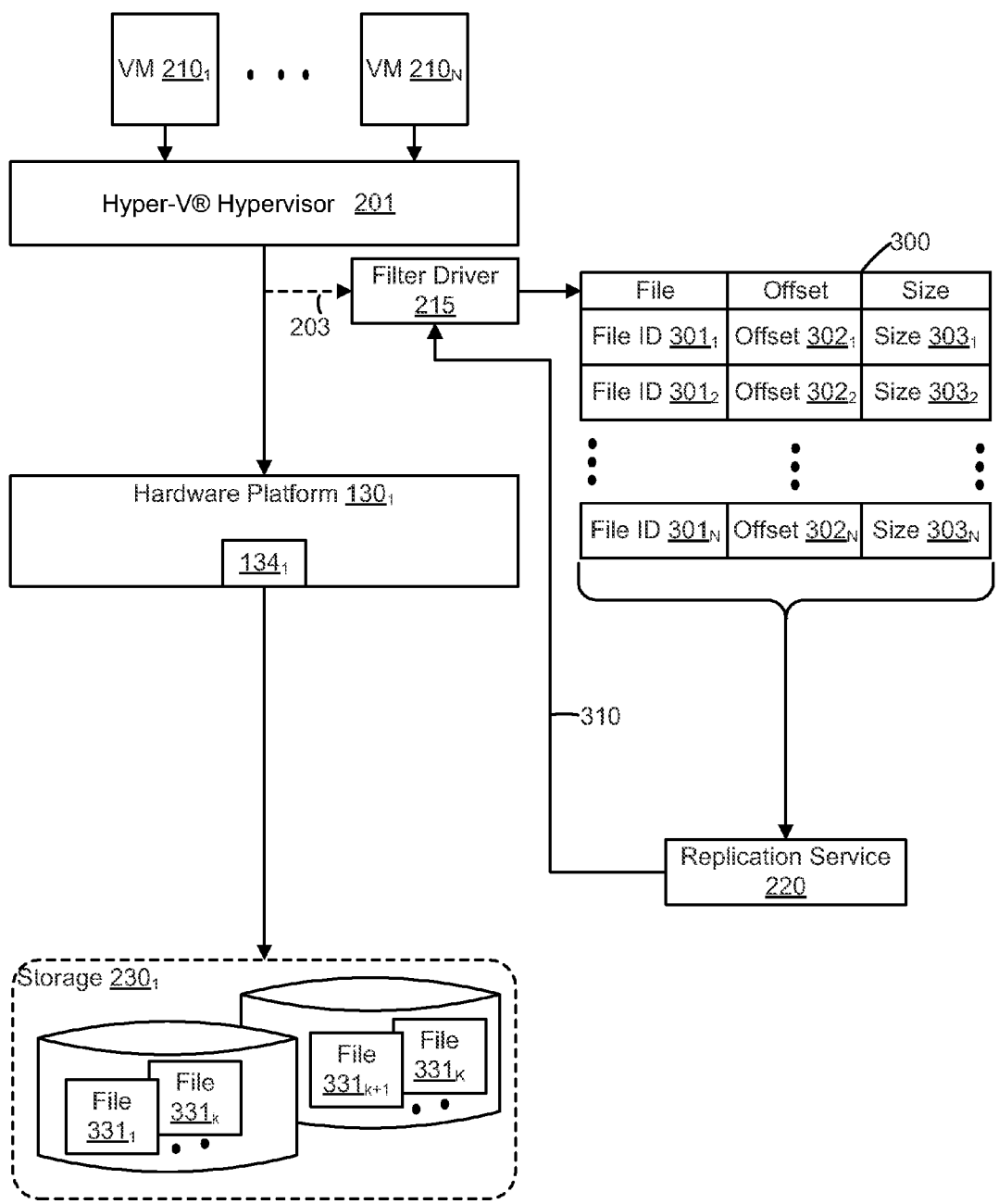
FIG. 3 is a block diagram that depicts that capture of file updates by a filter driver, according to embodiments.

FIG. 3 is a block diagram that illustrates the capture and recording of file updates by filter driver 215, according to embodiments. As shown, hypervisor 201 enables the concurrent execution of VMs $210_1$-$210_N$. In the course of execution, each of VMs $210_1$-$210_N$, may execute file updates (either writes to existing files or the creation of new files). Such file updates cause hypervisor 201 to issue writes to external storage, where the physical VM disk files are stored. For example, hypervisor 201 may perform a file update to a VM disk file in order to reflect an increase in physical disk space allocated to the corresponding virtual machine. The latter update may occur in a "thinly" provisioned virtual machine environment, wherein virtual machines are allocated physical storage on an as-needed basis. Hypervisor 201 also performs file updates to reflect the updating of user data by applications 111 that run in VMs 210. Further, hypervisor 201 may perform file updates on its own behalf, such as the updating of configuration files by a system administrator. Hypervisor 201 updates files by issuing write commands to storage interface 134, which is part of hardware platform 130$_1$. Storage interface 134 contains the appropriate device drivers to interact with storage 230$_1$ in order to enable the physical reading and writing of data. Referring to FIG. 3, the files allocated and stored in storage 230$_1$ are depicted as files 331$_{1-K}$. As shown, files 331 may be allocated to one or more physical disk storage units within storage 230$_1$. Note that one or more of the files 331 may also be a VM disk file 231.

As shown in FIG. 3, filter driver 215 intercepts file updates by hypervisor 201. Such interception is depicted by the dashed communication link 203. Filter driver 215, operating at the kernel level, intercepts all file updates regardless of the purpose of the update. That is to say, filter driver 215 intercepts and captures file updates that are performed on behalf of applications that run in virtual machines, on behalf of virtual machine guest operating systems, and on behalf of hypervisor 201. This intercept and capture methodology has the benefit of allowing the filter driver 215 to record file updates in real time, without introducing any delay in the operation of the file system. Indeed, if the filter driver 215 were to decide whether to capture and record each file update, the operation of the file system would slow down.

Still referring to FIG. 3, filter driver 215 captures each of the file write operations in a file update list 300. Embodiments of file update list 300 may be in a tabular format. However, any data structure capable of organizing data is envisioned, including linked lists, hash tables, relational database tables, or ASCII text files. File update list 300, as shown in FIG. 3, consists of multiple entries, each of which corresponds to a separate file update captured by filter driver 215. Each entry comprises a file indicator (or ID) 301, an offset 302, and a size 303. For example, if hypervisor 201 issues a file write to File A, which is allocated and stored in storage 230$_1$, certain blocks of File A will be updated or changed. Alternatively, in the case of a thinly provisioned file system, certain blocks of File A may be added. In still other cases, a file write to File A may be the result of the initial creation and allocation of File A in storage 230$_1$. In any case, the entry that corresponds to the file update (or write) to File A will be a file ID 301 that identifies that File A is the updated file. Such a file ID, in some embodiments, comprises a device address and block address for the File A, which enables the beginning block of File A to be located on a particular data storage unit within storage 230$_1$. In other embodiments, file ID 301 is an identifier that enables a file to be located in storage 230$_1$. Since only certain blocks of a given file are updated by a file write, offset 302 identifies the offset within the file (with respect to the beginning of the file, or "block zero" of the file) where the file update begins. For example, if File A comprises 1000 4 kilobyte data blocks, and the file update changes data in blocks 500 through 700 of File A, then offset 302 for the update would be 500. It is noted that in other embodiments, the unit of offset may be bits, bytes, words, segments, or any other unit of allocation of a disk file.

In addition, it should be noted that offset 302, in some embodiments, is a "logical" offset. In embodiments, physical blocks of File A are not allocated contiguously in storage 230$_1$. For example, a file may have the first 100 blocks allocated at physical block 500 of the storage device in which the file is allocated. However, blocks 100-300 may be allocated at physical block 200 of the same physical device. In such an example, logical offset 200 in the file would not be located at physical block 700 of the device (which would be the case if files are allocated contiguously), but rather at block 300 of the physical device.

Finally, size 303 is an indicator of the amount of data updated as a result of a file update. In embodiments, this amount of data updated corresponds to the number of contiguous file blocks updated. If, for example, in a single update transaction, blocks 500 through 700 of File A are updated, the size 303 corresponding to the update would be 201 because 700−500+1=201 contiguous updated blocks, starting from block 500.

Also shown in FIG. 3 is the communication that occurs between replication service 220 and filter driver 215. In embodiments, replication service 220 runs as a background user-level process. At predetermined time intervals, where such time intervals are configurable by a system administrator, replication service 220 sends a message to filter driver 215 to instruct filter driver 215 to transmit or otherwise communicate the file updates captured in file update list 300 over a prior time interval. Such communication, which is depicted as 310 in FIG. 3, may be done using inter-process communication, shared memory, message queuing software, or any other method of computer-based communication.

In response to the communication received from replication service 220, filter driver 215 transmits the file updates that it has captured and recorded in file update list 300. The transmission of file updates to replication service 220 may be implemented using any of, but not limited to, the aforementioned communication methods. In some embodiments, after communicating the file updates saved in file update list 300, filter driver 215 deletes or otherwise deallocates the saved entries in file update list 300. Filter driver 215 then continues to capture file updates in server 200 by saving new file update entries to file update list 300.

FIG. 4 is a block diagram that depicts the selection and organization of file updates by replication service 220. As was shown in FIG. 3, and as is depicted in FIG. 4, file update list 300 is transmitted to replication service 220. In the embodiment illustrated in FIG. 4, there are N file updates stored in file update list 300. As mentioned previously, the file updates captured in file update list 300 correspond to all updates performed on any file allocated and stored in storage 230$_1$. However, only virtual machine disk file updates are relevant to the replication of virtual machines running on server 200 to target server 250. Filter driver 215 may not make the determination of whether a file write operation corresponds to a virtual machine. However, replication service 220 can make this determination after it receives the file update list 300 from filter driver 215.

In some embodiments, replication service 220 makes the determination as to whether a given file write operation corresponds to a virtual machine by issuing a system level query to hypervisor 201 for information about all VMs 210 managed by hypervisor 201. In some embodiments, replication service 220 receives from hypervisor 201 an enumeration of all VMs 210 on server 200. This enumeration includes virtual machines that are powered on and those that are powered off or suspended. The information received from hypervisor 201 includes, for each virtual machine, virtual hardware details, such as the number of virtual CPUs, the number of virtual disk controllers, and the number of virtual network adapters. In addition, the information received for each virtual machine includes the names of all files associated with all virtual disks for a given virtual machine.

Therefore, having received this information from hypervisor 201, replication service 220 is able to cycle through file update list 300 received from filter driver 215 and, for each file update in the list, make a determination, based on the file ID 301 for a current entry in the list, whether the current list entry (i.e., the current file update) corresponds to a VM disk file.

Upon determining that a file write operation found in file update list 300 corresponds to a VM disk file (or "vDisk"), embodiments of replication service 220 then save the file update in a separate list data structure to be used when file updates are transmitted to target server 250. In FIG. 4, such a data structure is depicted as a two-level linked list referred to herein as VM update list 400. In VM update list 400, each list entry corresponds to a VM disk file for which one or more updates are detected by replication service 220 in file update list 300.

In the embodiment depicted in FIG. 4, each entry of VM update list 400 itself comprises a list of regions within the corresponding VM disk file, referred to herein as a vDisk update list 410. That is, each vDisk update list 410 is the head node of the list of updated regions within the corresponding VM disk file. For example, the first entry in VM update list 400 is depicted as vDisk update list $410_1$. As shown, vDisk update list $410_1$ is a data structure that contains pointers to other data structures. First, vDisk update list $410_1$ contains a pointer $411_1$, which is the device and block address within storage $230_1$ where the file that vDisk update list $410_1$ corresponds to is allocated. For example, if vDisk update list $410_1$ corresponds to updates to virtual machine disk file VM1.vhdx, then, according to embodiments, pointer $411_1$ is the device and block address at which VM1.vhdx is stored within storage $230_1$. In some embodiments, pointer $411_1$ is a name by which the file system may locate the file (i.e., VM1.vhdx.

In addition, vDisk update list $410_1$ includes a pointer to a first vDisk update entry $415_{11}$, which stores an offset $302_{11}$ and a size $313_{11}$, and which corresponds to an update to the VM disk file pointed to by pointer $411_1$. For example, assume that filter driver 215 detects and captures a file update to vDisk VM1.vhdx. Further, the update changes 100 file blocks located at a logical offset of 200 file blocks from the disk address at which VM1.vhdx is stored (i.e., at the disk address that pointer $411_1$ points to). As mentioned earlier, in some embodiments, logical offsets are used for storage devices and file systems where the files are not allocated contiguously. In this example, 200 is saved in the offset field $312_{11}$ (corresponding to the 200-block logical offset from where VM1.vhdx is allocated within storage $230_1$) and 100 is saved in size field $312_{11}$ (corresponding to the 100 updated file blocks). It is noted that embodiments may specify file offsets and update sizes in units other than blocks, such as, for example, bits, bytes, words, kilobytes, segments, or megabytes.

Finally, vDisk update list $410_1$ includes a pointer that points to the next vDisk update list (in this case, vDisk update list $410_2$) in list 400. As shown in FIG. 4, vDisk update list $410_2$ includes a pointer to a next vDisk Update $410_3$. The list terminates at vDisk update list $410_n$. This illustrates that, in the embodiment depicted in FIG. 4, replication service 220 selected file updates for n VM disk files.

With respect to the vDisk update entries 415, each contains a pointer that points to a next vDisk update entry in the corresponding vDisk update list 410. Thus, in the embodiment depicted in FIG. 4, vDisk update entry $415_{11}$ includes a pointer to vDisk update entry $415_{12}$. Subsequent vDisk update entries $415_1$ point to a next vDisk update entry until the list terminates at vDisk update entry $415_{1k}$. Note that each vDisk update entry corresponds to a discrete update to a VM disk file, described by both the offset and size of the update with respect to the device and block address of the VM disk file in storage $230_1$. As shown in FIG. 4, k file updates are stored for the VM disk file pointed to by pointer $411_1$, l file updates are stored for the VM disk file pointed to by pointer $411_2$, and m file write operations are stored for the VM disk file pointed to by pointer $411_n$.

Figure 5:
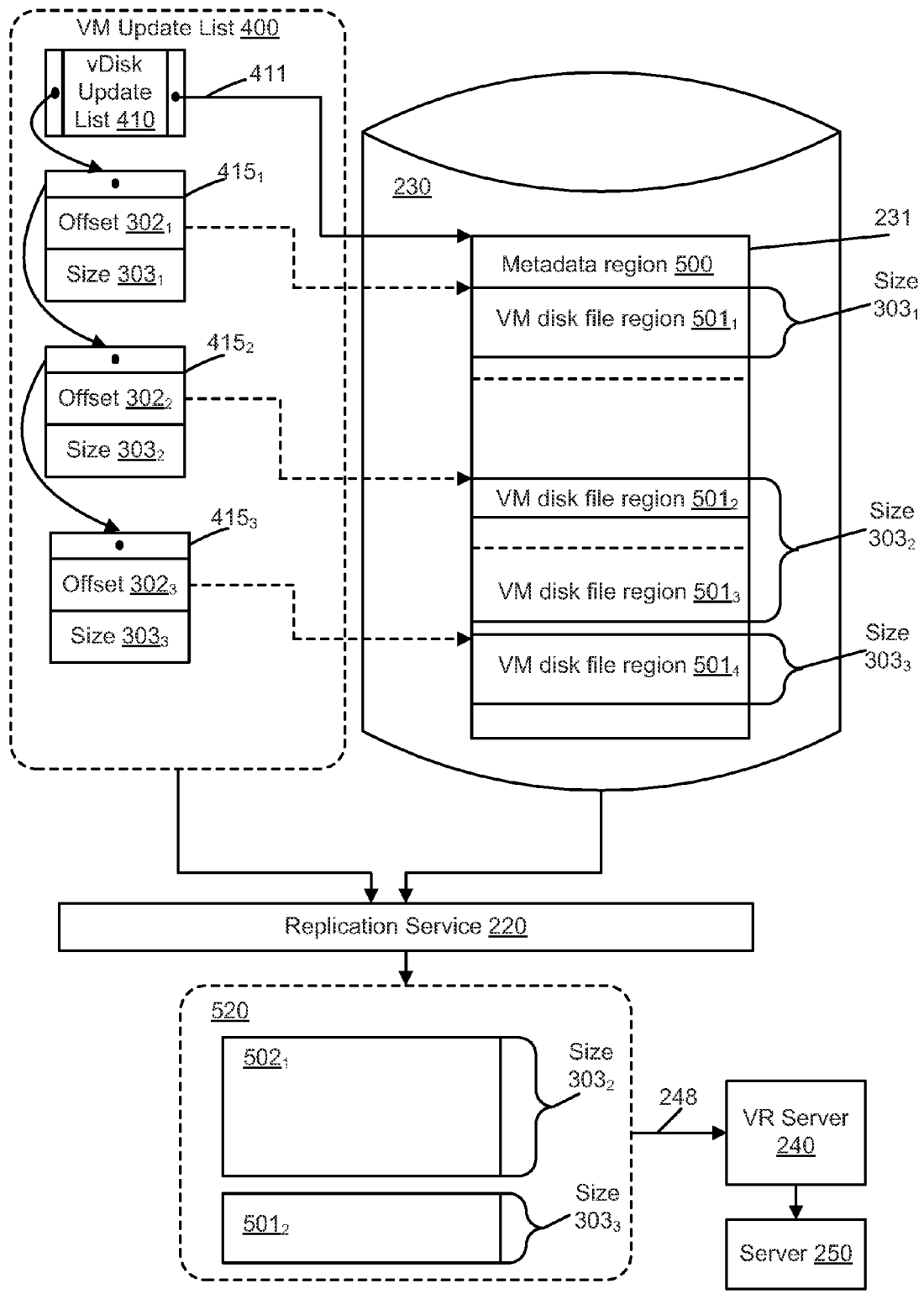
FIG. 5 is a block diagram that illustrates the transmission of virtual machine file updates from a source server to a target server by a replication service, according to embodiments.

FIG. 5 is a block diagram that depicts the transmission of file updates to server 250 by replication service 220 according to some embodiments. In some embodiments, replication service 220 performs a snapshot operation on the disk storage units comprising storage $230_1$ at the time file updates are selected from VM update list 400 for transmission to target server 250 to ensure the consistency of the transmitted data. Indeed, while replication service 220 processes VM update list 400 to transmit the file updates to server 250, file updates continue unabated on server 200. Thus, in order to transmit a consistent set of updates made to VM disk files at a certain point in time, replication service 220 takes a snapshot of the storage units. Note that subsequent file writes that occur while replication service 220 transmits file updates to target server 250 are captured and stored by filter driver 215 in file update list 300. Further, in some embodiments, taking a snapshot of the disk storage units comprising storage $230_1$ may not result in a full copy being made of the disk storage units. Rather, the contents of the disk storage units are preserved up until the time the snapshot is taken, while updates to the disk storage units subsequent to the time the snapshot is taken are logged separately. Thus, the current contents and state of a disk storage unit comprises the contents of the disk storage unit at the time of a snapshot along with the logged changes subsequent to the snapshot.

At a point in time after replication service 220 cycles through file update list 300 and places each update that corresponds to a VM disk file in VM update list 400, replication service 220 commences transmitting updated VM disk file regions to server 250. As mentioned previously, in some embodiments, replication service 220 maintains vDisk update entries 415 in VM update list 400 until a timer maintained for the VM that corresponds to the updates expires, thereby saving CPU and memory resources of the Hyper-V® server. The interval for the replication timer maintained for the VM is generally longer than the time interval between successive receiving of file updates from file update list 300. In the embodiment illustrated in FIG. 5, VM update list 400 contains a single vDisk update list 410, wherein vDisk update list 410 corresponds to one VM disk file. As shown, vDisk update list 410 includes three file updates. That is, vDisk update list 410 contains three entries (i.e., vDisk update entries 4151_3), each of which corresponds to an offset and size of a file update made to the VM disk file to which vDisk update list 410 corresponds. In FIG. 5, vDisk update list 410 contains a pointer 411, which, in some embodiments, indicates the name of vDisk file 231, which is stored in storage 2301.

Referring to vDisk update list 410, each of the vDisk update entries $415_{1-3}$ include an offset and size that correspond to an updated region of VM disk file 231. For example, vDisk update entry $415_1$ stores offset $302_1$ and size $303_1$. This offset and size corresponds to file region $501_1$ in VM disk file 231. As shown, vDisk update entry $415_2$ stores offset $302_2$ and size $303_2$, which correspond to two overlapping file regions $501_2$ and $501_3$ of VM disk file 231. In embodiments, when two or more file updates are captured that span overlapping file regions for the same VM disk file 231, rather than allocating a separate vDisk update entry that corresponds to each of the overlapping regions, embodiments of replication service 220 create a vDisk update entry in vDisk update list 410 that spans all of the overlapping regions, thereby resulting in fewer vDisk update entries in vDisk update list 410. This minimizes the number of required data transmissions to server 250. Hence, in FIG. 5, file regions $501_2$ and $501_3$ overlap, where both regions correspond to vDisk update entry $415_2$. The overlapping region is at offset $302_2$. Further, an expression for size $303_2$ (the size of the overlapping region depicted in FIG. 5) may be derived as follows: starting block address of region $501_3$–starting block address of region $501_2$+size of region $501_3$. Note that FIG. 5 depicts one example of overlapping updated file regions for VM disk file 231. In other cases, file regions may overlap in different ways, including a case where a single updated file region encompasses multiple previously updated file regions. All such cases are within the scope of the present invention.

Finally, vDisk update entry $415_4$ stores offset $302_4$ and size $303_4$, which correspond to file region $510_4$. Note that, in some embodiments, a "file region," as disclosed herein, corresponds to either a physically contiguous group of file blocks or, in some embodiments, a "logically" contiguous group of file blocks within VM disk file 231.

As shown, VM disk file 231 contains a metadata region 500. In embodiments, metadata region 500 contains metadata for the virtual disk that is stored within VM disk file 231. For example, in Hyper-V® virtual machine environments, which implement virtual disks in the .vhdx format, the metadata section may be 1 megabyte in size and contain version information, the location and size of disk logging data, and other basic file metadata. The metadata section also describes the layout of user data blocks in VM disk file 231. The metadata section is used, along with vDisk update entries 415 in VM update list 400, to locate the changed file blocks to transmit to the target server. The metadata located in metadata region 500 is only accessed, understood, and used by hypervisor 201. That is, none of the contents of metadata region 500 is of any use to hypervisor 251 running on server 250 because ESX implements virtual disks using a different format (i.e., the .vmdk format) than that used by a Hyper-V® platform. However, updates to metadata region 500 are captured by filter driver 215 because filter driver 215 captures and records all file updates, regardless of the type of file updated, or the particular region of the file updated. Therefore, replication service 220 must "filter" metadata region 500 from the data that is transmitted to target server 250. Further, although metadata region 500 is depicted as a contiguous block at the beginning of VM disk file 231, other embodiments have metadata region 500 placed at other offsets within VM disk file 231. Still other embodiments have multiple metadata regions 500 located at various points within VM disk file 231.

By contrast, the updated file blocks of VM disk file 231 that are external to metadata region 500 are transmitted to the target server 250 because these file regions correspond to virtual disk updates performed either by a guest application 111 or a guest operating system 112 running within a VM 210. Accordingly, replication service 220 selects the set of file updates that only correspond to "user" updates (i.e., to updates caused by guest applications 111 or guest operating system 112).

Referring back to FIG. 5, replication service 220 selects regions $501_2$, $501_3$, and $501_4$ for transmission. Note that region $501_1$ is not selected for transmission because region $501_1$ lies within metadata region 500. Embodiments of replication service 220 are implemented with information regarding the format of a VHDX virtual disk, which enables replication service 220 to scan VM disk file 231 and filter out any file updates in VM update list 400 that correspond to metadata region 500.

Replication service 220 builds a transmit list 520 that is based on the file updates selected from VM update list 400 and vDisk update list 410. Referring to FIG. 5, transmit list 520 contains two transmission blocks $502_{1-2}$ that correspond to two of the three file write entries selected from vDisk update list 410. The first transmission block $502_1$ corresponds to the two separate regions $501_2$ and $501_3$, which are overlapping regions. The second transmission block corresponds only to region $501_4$ because region $501_4$, as shown in FIG. 5, does not overlap with any other region.

Note that transmission blocks 5021 and 5022 represent the physical data that needs to be transmitted to target server 250, as that data resides in storage 230. In embodiments, file regions 5012, 5013, and 5014 are data blocks that are logically offset from the beginning of virtual disk file 231, which is a Hyper-V® virtual disk. In order to correctly transfer the Hyper-V® virtual disk to target server 250, embodiments of replication service 220 perform an "address translation" (using the virtual disk 231 metadata in metadata region 500) which translates the Hyper-V® logical offsets into offsets that correspond to the target virtual disk as seen by target VM 260. The translated offsets are used to correctly store the updated source data to the target virtual disk of target VM 260. For example, a file update may be located at an offset of 200 blocks from the beginning of a virtual disk file, as seen by the Hyper-V® hypervisor. However, the same update may be located at an offset of 100 blocks from the beginning of a virtual disk as seen by the virtual machine to which the virtual disk belongs. In such a case, replication server 220 translates the offset of 200 into an offset of 100 and, in some embodiments, transmits the translated offset 100 of the updated virtual disk data, as well as the size of the update (e.g., the number of updated blocks), along with the updated virtual disk data in transmission blocks 502.

Once transmission list 520 is constructed, transmission blocks 502 are transmitted to server 250 via VR server 240. In embodiments, transmission from replication service 220 to VR server 240 is performed using a Lightweight Delta (LWD) protocol.

As mentioned, in some embodiments of the present invention, a logical offset and block length are also transmitted along with the actual transmission blocks 502 because embodiments of the LWD protocol require it. As noted earlier, a logical offset is the offset of a block in a virtual disk from the viewpoint of a VM, while, in some embodiments, the offsets 302 described in VM update list 400 are offsets in the virtual disk from the viewpoint of the hypervisor. Therefore, to accommodate the requirements of some versions of the LWD protocol, embodiments of replication service 220 transmit "translated" logical offsets (i.e., VM-oriented offsets calculated based on offsets 302 and the virtual disk metadata), along with the size and data content of the changed file blocks.

Figure 6:
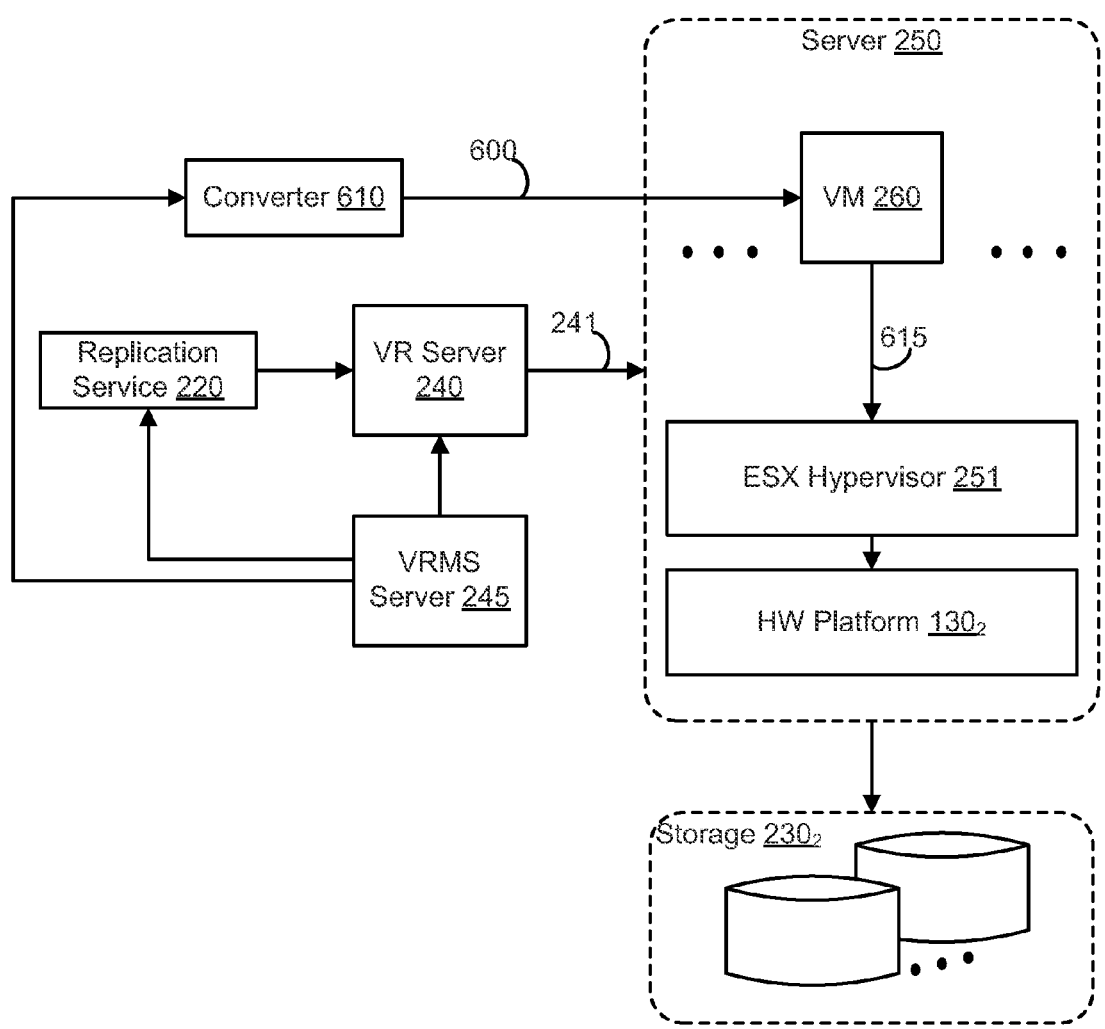
FIG. 6 is a block diagram that depicts, according to embodiments, the booting of a target virtual machine after replication from a source virtual machine to the target virtual machine has completed.

FIG. 6 is a block diagram that depicts the booting of a target VM 260 on server 250 once transmission of updates to a corresponding source VM 210 are completed, according to an embodiment. Note that target VM 260 may be booted after multiple file updates corresponding to source VM 210 are transmitted to server 250. As illustrated earlier, replication service 220 transmits the updated VM disk file regions 501 to VR server 240 using the LWD protocol. VR server 240 receives the updated VM disk file regions and transmits them to target server 250 using, in some embodiments, the Network File Copy (NFC) protocol. NFC transmission of updated VM disk file regions 501 to server 250 is depicted as transmission link 241. It should be noted that transmission between the source server 200 and the target server 250 may be accomplished using any suitable network transmission protocol, such as TCP/IP, Synchronous Data Link Control, Ethernet, or the like. As mentioned earlier, VRMS server 245 orchestrates the replication of data updates between a source and target server. VRMS server 245 communicates with VR server 240 and with replication service 220 in order to coordinate the replication process. In addition, after all updates to a VM 210 are transmitted to a corresponding VM 260 on target server 250, VRMS server 245 communicates with converter 610 in order to properly configure target VM 260. Converter 610 performs the task of reconfiguring guest OS 112 of VM 260 in order ensure that virtual hardware platform 115 of VM 260, which differs from that of VM 210, is properly recognized by target VM 260. Converter 610 may run as a process in server 250 or, as depicted in FIG. 6, in a separate physical host having network connectivity to server 250. Communication from VRMS server 245 to converter 610 is depicted in FIG. 6 as communication link 600. The reconfiguration performed by converter 610 is analogous to the reconfiguration usually required when porting an operating system from one physical computer to another physical computer, where the underlying hardware of each physical computer differs from the other. The reconfiguration performed by converter 610 is depicted in FIG. 6 as communication link 615. Once converter 610 reconfigures the virtual hardware platform of VM 260, VRMS server 245 starts VM 260 by issuing a boot command to hypervisor 251, which is depicted as communication link 620. This boot command instructs hypervisor 251 to start VM 260. At this point, the state of VM 260 is equivalent to its corresponding source VM 210 as of the time of the most recent prior replication.

Figures 7A, 7B:
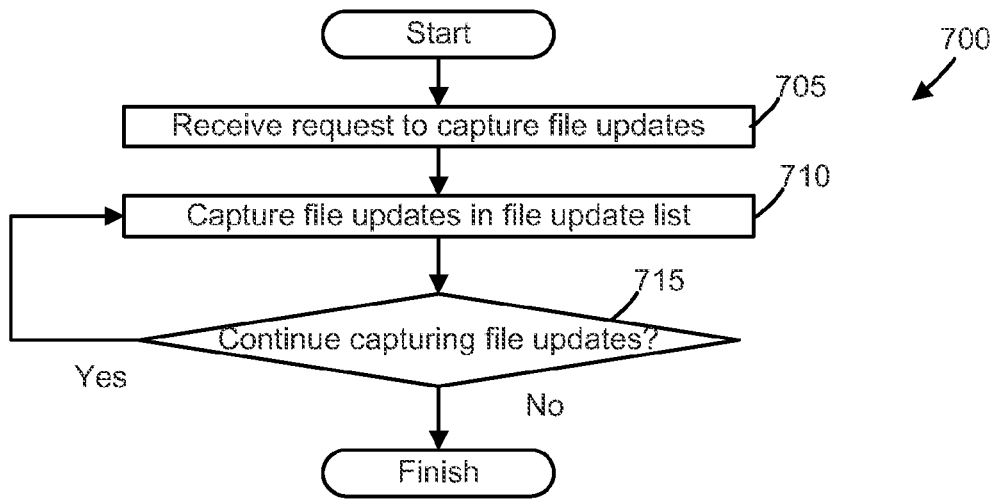
FIG. 7A is a flow diagram of a method executed by a filter driver to capture and record file updates on a server according to embodiments
FIG. 7B is a flow diagram of a method executed by a filter driver to communicate captured file updates to a replication service, according to embodiments.

FIG. 7A is a flow diagram of a method 700 executed by filter driver 215 to capture and record file updates on a server according to embodiments. The method starts at step 705, where filter driver 215 receives a request to capture file updates. In embodiments, such a request may be received from a system administrator using an interface. Other methods of communicating the request are contemplated and within the scope of the invention. At step 710, filter driver captures file updates in a file update list. An example of a file update list is depicted in FIG. 3. As was previously mentioned, filter driver 215 captures all file updates on server 200. In the embodiment illustrated in FIG. 3, the file update list is in the format of a table, wherein each table entry comprises a file identifier, an offset within the file that indicates the first updated file block, and a size field that indicates the number of blocks updated. However, other data structures capable of storing a list of file updates are within the scope of the invention.

At step 715, filter driver 215 determines whether to continue capturing file updates. The determination at step 715 may be made based on receiving a request by a system administrator using an interface. Other methods of communicating such a request are contemplated and within the scope of the invention. If filter driver 215 determines that file updates are to continue to be captured, method 700 returns to step 710 to capture further file updates in the file update list. If filter driver 215 determines that file updates no longer to be captured, method 700 terminates.

FIG. 7B is a flow diagram of a method 750 executed by filter driver 215 to communicate captured file updates to replication service 220, according to embodiments. The method begins at step 755, where filter driver 215 receives a request to provide captured file updates to replication service 220. In embodiments, the request to provide the file updates is received from replication service 220 based on a schedule. At step 760, filter driver 215 receives a buffer from replication service 220. The buffer provided by replication service 220 is of a fixed size and is used, in one or more embodiments, to communicate file updates from filter driver 215 to replication service 220. At step 765, filter driver 215 writes file updates that it captures in file update list 300 to the buffer received at step 760. At step 767, filter driver 215 removes the file updates written to the buffer from the file update list that the updates were captured in. This step is performed to free memory used by filter driver 215 to initially store file updates. At step 770, replication service 220 determines whether the buffer has been filled. As mentioned, the buffer received at step 760 is of a fixed size. Replication service 220 process and removes data items (i.e., file updates) from the buffer, but it may do so at a slower rate than the rate at which filter driver 215 writes updates to the buffer. In such a case, the buffer may fill (i.e., the available space in the buffer is exhausted). If filter driver 215 determines that the buffer is full, then method 750 proceeds back to step 755 to receive further requests from replication service 220 to provide file updates. This has the beneficial effect of allowing replication service 220 to process the buffer, thereby freeing space in the buffer. In the meantime, file updates continue to be accumulated in file update list 300 (as depicted in FIG. 7A).

If filter driver 215 determines that the buffer has not been filled, then, at step 775, filter driver 215 determines whether all file updates have been provided. Filter driver 215 makes this determination, in some embodiments, based on whether any further updates exist in file update list 300. Note, while file updates are written to the buffer, embodiments of filter driver 215 delete the file updates from file update list 300, thereby freeing up system memory, as described in step 767. If filter driver 215 determines that all file updates have not been provided, then method 750 returns to step 765 to write additional file updates to the buffer. If all file updates have been provided, then method 750 returns to step 755 to receive further requests from replication service 220 to provide file updates.

Figure 8:
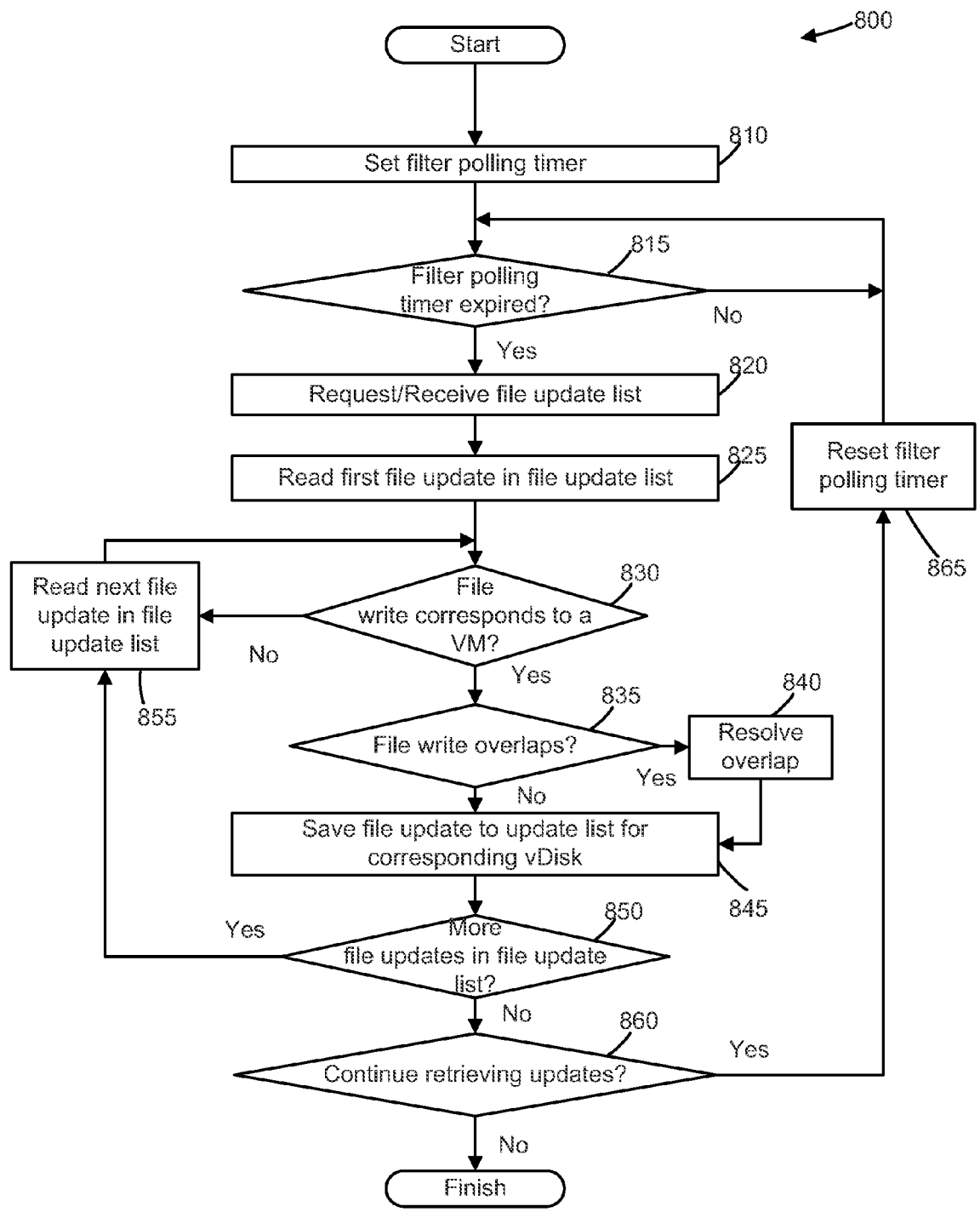
FIG. 8 is a flow diagram that illustrates a method to retrieve virtual disk file updates from a filter driver executing on a source Hyper-V® server and save the virtual disk file updates in update lists that correspond to the virtual disk files, according to embodiments.

FIG. 8 is a flow diagram that illustrates a method 800 that retrieves virtual disk file updates from a filter driver executing on a source Hyper-V® server and saves the virtual disk file updates in update lists that correspond to the virtual disk files, according to embodiments. Method 800 is usually executed by replication service 220 executing on a source Hyper-V® server.

Method 800 begins at step 810, where a filter polling timer is set. In embodiments, a filter polling timer is used by replication service 220 to determine one or more times that replication service 220 will receive file updates from filter driver 215. At step 815, a determination is made as to whether the timer set in step 810 has expired. If the timer has not expired at step 815, method 800 proceeds back to step 815. In embodiments, method 800 may wait a predetermined time before re-executing step 815.

If the filter polling timer has expired at step 815, method 800 proceeds to step 820, where a list of file updates is requested and received. In embodiments, the request is made by the replication service to the filter driver. In response to the request, the replication service receives the file updates from the filter driver. As mentioned earlier, in connection with FIG. 8, file updates are requested and received by using a buffer provide to filter driver 215 from replication service 220. Once the file updates are received at step 820, the received file update list is processed by replication service 220 in steps 825 through 850. Still referring to FIG. 8, method 800 proceeds to step 825, where a first update in the received file updates received at step 820 is read. At step 830, a determination is made as to whether the file update corresponds to the updating of a VM disk file. In embodiments, the determination is made by performing a system query to determine the set of all vDisks currently allocated in storage $230_1$ of Hyper-V® server 200 that belong to a VM that is configured to be replicated and, once the set of vDisks is determined, comparing the target of the file update currently under consideration with each of the vDisks in the set of vDisks. In embodiments, a VM may be configured to be replicated by a system administrator using a user interface. If the target of the file update matches one of the vDisks, then method 800 proceeds to step 835, where replication service 220 determines whether the current file update overlaps with one or more other file updates corresponding to the same vDisk. As mentioned earlier, replication service consolidates and saves overlapping file updates in a VM update list. If replication service 220 determines that the current file update is an overlapping file update, then the method proceeds to step 840, where the overlap is resolved. Resolving of overlapping file updates, in some embodiments, consists of consolidating the current update with one or more updates the current update overlaps within a VM update list.

At step 845, the file update is saved to the VM update list. In embodiments, the VM update list, as depicted in FIG. 4, is a two-level linked lists (i.e., a "list of lists"), where each list entry on the first level corresponds to a particular VM disk file, and where the entries on the second level correspond to the updates made to the particular VM disk file. It is important to note that a two-level linked list, as depicted in FIG. 4, is one type of data structure that may be used to embody the VM update list; other data structures are envisioned. For example, tree structures, relational database tables, hash tables, and various other data structures are possible.

If, at step 830, replication service 220 determines that the file update under consideration does not correspond to a VM disk file, method 800 proceeds to step 855, where the next file update in the received file updates is read. At step 850, replication service 220 determines whether more received file updates exist. If there are more file updates, the method proceeds to step 855, where the next file update in the received file updates is read. However, if all received file updates have been read, method 800 proceeds to step 860. At step 860, replication service 220 determines whether to continue retrieving updates from filter driver 215. If replication service 220 is to continue retrieving updates, then the method proceeds to step 865, where the filter polling timer is reset. Replication service 220 then repeats the process of retrieving and processing file updates from filter driver 215. If replication service 215 determines at step 860 that no further updates are to be retrieved, then method 800 terminates.

Figure 9:
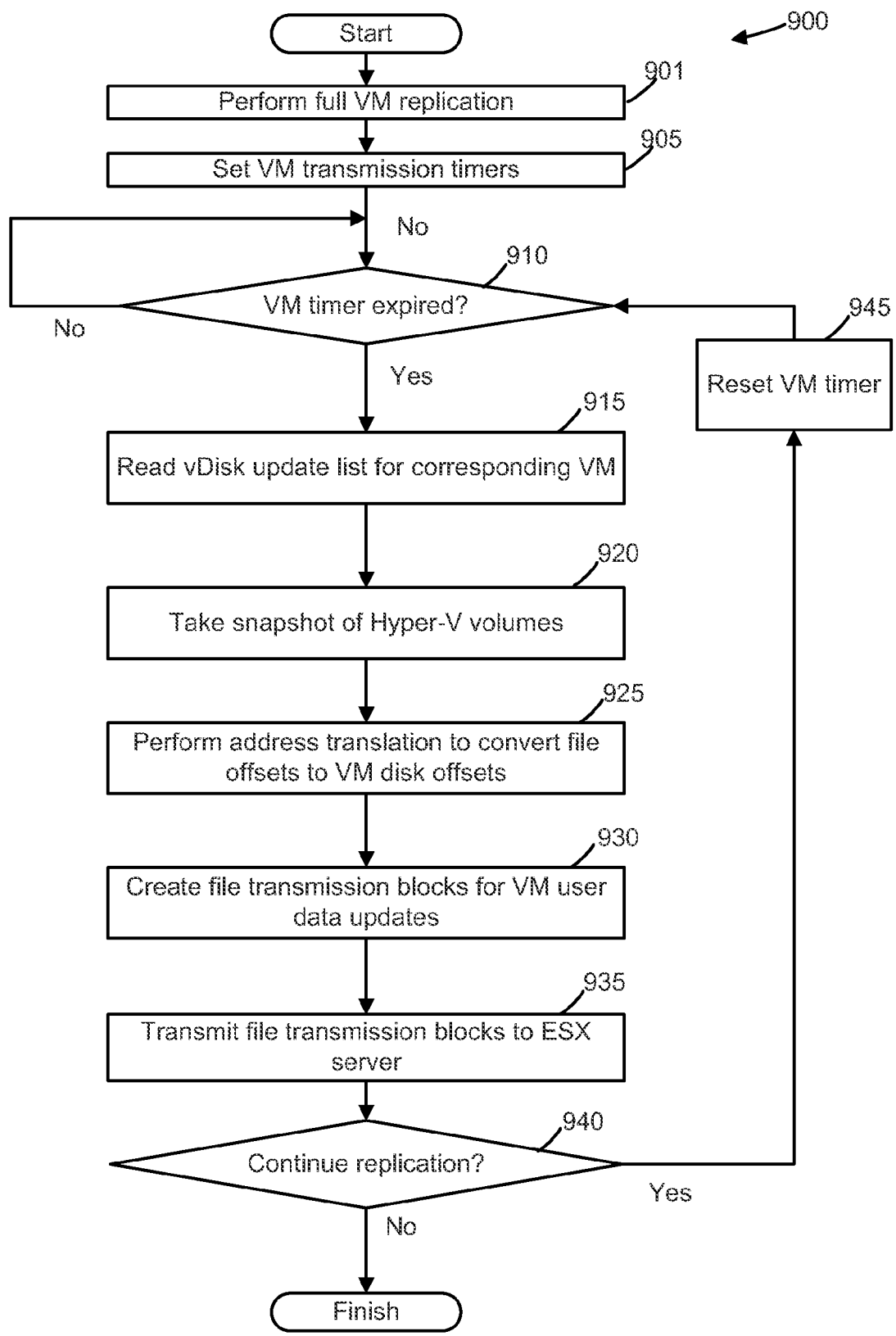
FIG. 9 is a flow diagram that depicts a method of replicating file updates from a source Hyper-V® server to a target ESX server, according to embodiments.

FIG. 9 is a flow diagram that depicts a method 900 of replicating file updates from a source Hyper-V® server to a target ESX server, according to embodiments. Method 900 is usually executed by replication service 220 executing on the source Hyper-V® server. Method 900 begins at step 901, where a full replication of source VMs is performed. In embodiments, a full replication is performed by taking a snapshot of the storage units on the source Hyper-V® server, and transmitting full copies of the VM disk files (i.e., the vDisks) of VMs to corresponding target VMs on the target ESX server. Thus, after step 901, a fully replicated image of each source VM is transmitted to the target ESX server and stored in a persistent storage connected to the target ESX server. However, after step 901 is complete, none of the target VMs are started.

The method proceeds to step 905, where one or more VM transmission timers are set. As discussed earlier, in some embodiments, replication of VM disk file updates from a source Hyper-V® server to a target ESX server is delayed until a timer for the corresponding VM expires. This has the benefit of making more efficient use of the source CPU and the network over which transmission takes place. At step 910, the method determines whether a VM timer has expired. When a timer for one of the VMs expires, the method proceeds to step 915, where replication service 220 reads the vDisk update list for the VM in order to begin the process of transmitting updated physical file blocks to the target ESX server for the VM. If none of the VM timers has expired, the method maintains itself in a wait state until one of the VM timers expires.

At step 920, a snapshot of the physical disks of the source Hyper-V® server is taken. The physical disks of the source Hyper-V® server are depicted as the disk storage units of storage 2301 in FIG. 2. As mentioned earlier, snapshots of the disk storage units are taken in order to facilitate the transmission of a consistent set of file updates from the source Hyper-V® server to the target ESX server. At step 925, replication service 220 performs address translation which translates Hyper-V® logical offsets into offsets that correspond to the target virtual disk offsets that are to be used by target VM 260 on target server 250. As mentioned earlier, the translated offset data is included with the data transmitted to target server 250.

Still referring to FIG. 9, at step 930, file transmission blocks 502 are created in order to transmit the updates to the target ESX server. As shown in the embodiment depicted in FIG. 5, vDisk update list 410 is traversed to determine the physical file blocks within storage $230_1$ that are to be transmitted. Both overlapping and non-overlapping virtual disk file updates are read from vDisk update list 410, and the updates read are used to create file transmission blocks 502.

At step 935, file transmission blocks and the translated offsets (as well as the block size of the corresponding file updates) are transmitted to target server 250. Further, only updates to VM user data are transmitted to the target server 250. That is, metadata, used only by the hypervisor (which, in some embodiments, only appears in a metadata region of a VM disk file), is not transmitted to the target server 250. Only "user" updates (i.e., VM disk updates that correspond to updates made by guest applications or by guest operating systems) are transmitted. As described earlier, embodiments determine whether a particular updated block corresponds to user data or metadata.

In embodiments, the transmission performed at step 935 uses a vSphere® Replication (VR) server. The transmission blocks are first transmitted to a VR server using a Lightweight Delta (LWD) protocol, whereupon the VR server then transmits the blocks to the target ESX server using the Network File Copy protocol. It should be noted, though, that other data transmission protocols are within the scope of the invention.

At step 940, a determination is made as to whether replication is to continue. Replication can end, for example, when a failure of one or more source VMs is detected. In addition, replication can end due to the intervention of a system administrator. If it is determined that replication is to end at step 940, then method 900 terminates. Otherwise, method 900 proceeds to step 945, where the VM timer that expired at step 910 is reset. Method 900 then proceeds back to step 910 until a VM timer expiration is detected.

Figure 10:
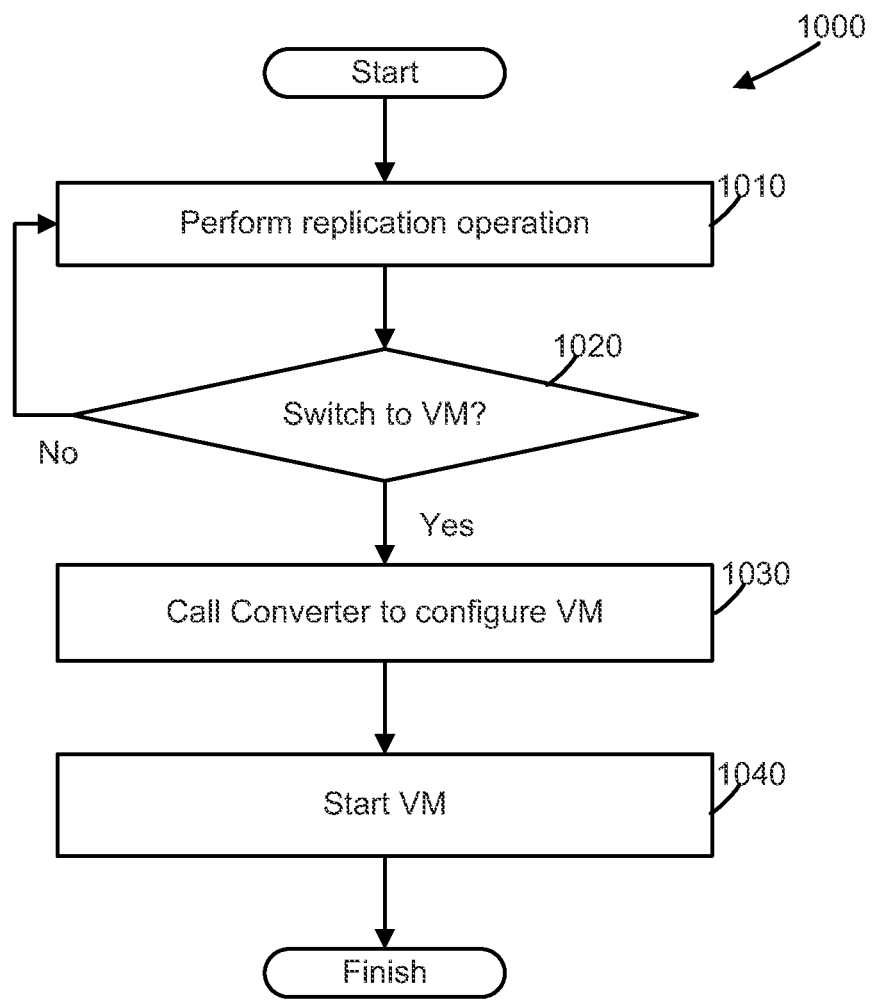
FIG. 10 is a flow diagram that depicts the steps of reconfiguring a target VM and starting the target VM, according to embodiments.

FIG. 10 is a flow diagram that depicts a method 1000 that performs the steps of reconfiguring a target VM and starting the target VM, according to embodiments. At step 1010, the replication of a source VM to a target VM is performed. In embodiments, this replication takes place according to methods 700, 750, 800 and 900, described in FIGS. 7A, 7B, 8, and 9, respectively. At step 1020, a determination is made as to whether a switch is to be made from a source VM to a target VM. That is, the determination made is whether a source VM ceases execution and a corresponding target VM starts executing in its place. Such a determination may be based on any of several factors. For example, the determination at step 1020 may be based on whether a VM has failed, whether a VM is overburdened, or whether the VMs on the source Hyper-V® server platform are to be consolidated on to a target ESX server platform. Other factors may form the basis for the determination at step 1020.

If, at step 1020, it is determined that a switch to the target VM is not to be made, then method 1000 returns to step 1010 to continue replication. However, if a switch to the target VM is to be made, then a call is made to converter 610 (which, as explained above, is a software component that performs the task of reconfiguring the guest OS of the target VM in order to ensure that the virtual hardware platform of a VM is recognized by the guest OS of the VM running on the target ESX server) at step 1030. In some embodiments, the vCenter Converter Standalone product, which is available from VMware, Inc., may be adapted to perform the reconfiguration of the target VM. The reconfiguration performed by converter 610 is analogous to the reconfiguration often required when porting an operating system from one physical computer to another physical computer, where the underlying hardware of each physical computer differs from the other. After converter 610 reconfigures the guest OS of the target VM at step 1030, the target VM is started at step 1040. In embodiments, the starting of an VM is accomplished via a boot command transmitted from a VRMS server to the ESX hypervisor running on the target ESX server, which causes the ESX hypervisor to start a target ESX virtual machine.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a plurality of networked computer servers having a first server and a second server, wherein the first server has executing therein a first virtual machine with a plurality of virtual disks stored as files in a first storage unit connected to the first server, and the second server includes a second virtual machine with a plurality of virtual disks stored as files in a second storage unit connected to the second server, a method of replicating the first virtual machine to the second virtual machine, the method comprising:

transmitting the virtual disks of the first virtual machine to the second server, wherein each transmitted virtual disk corresponds to one of the plurality of virtual disks of the second virtual machine, and wherein the virtual disks of the first virtual machine have a first format and the virtual disks of the second virtual machine have a second format, wherein a hypervisor of a first type is installed in the first server to support execution of the first virtual machine and a hypervisor of a second type is installed in the second server to support execution of the second virtual machine;

capturing a plurality of updates to the files in the first storage unit corresponding to the virtual disks of the first virtual machine subsequent to the transmission of the virtual disks of the first virtual machine;

selecting updates caused by guest applications or guest operating system running within the first virtual machine from the plurality of updates while filtering out updates corresponding to metadata region of the virtual disks of the first virtual machine, wherein the metadata region contains format information of the virtual disks of the first virtual machine that is accessed and understood by the hypervisor of the first type and not by the hypervisor of the second type;

identifying contiguous data blocks in the virtual disks of the first virtual machine that are subject to the selected updates; and transmitting the identified contiguous data blocks to the second server for storage in the virtual disks of the second virtual machine.

2. The method of claim 1, wherein each update comprises a file identifier, a block offset, and a number of updated blocks.

3. The method of claim 1, wherein each of the plurality of virtual disks of the first virtual machine stored as files includes the metadata region and a user data region.

4. The method of claim 3, wherein the selected updates are each an update to the user data region of the file corresponding to the virtual disk being updated.

5. The method of claim 1, further comprising:
building a transmit list comprising one or more transmission blocks, wherein each transmission block comprises a plurality of the identified contiguous data blocks.

6. The method of claim 5, wherein said capturing includes:
determining that two or more of the updates are overlapping updates; and
creating a transmission block that comprises all of the data blocks corresponding to one of the updates and part of the data blocks corresponding to another one of the updates.

7. The method of claim 1, further comprising:
taking a snapshot of a plurality of storage units connected to the first server prior to said transmitting, wherein the identified contiguous data blocks are retrieved from the snapshot.

8. The method of claim 1, further comprising:
determining that execution of the first virtual machine in the first server is to be halted;
halting execution of the first virtual machine in the first server; and
starting execution of the second virtual machine in the second server, the second virtual machine being a replicated version of the first virtual machine.

9. A non-transitory computer readable storage medium having stored thereon computer readable program code for replicating virtual machines between a first server and a second server connected in a network, wherein the first server has executing therein a first virtual machine with a plurality of virtual disks stored as files in a first storage unit connected to the first server and the second server includes a second virtual machine with a plurality of virtual disks stores as files in a second storage unit connected to the second server, the computer readable program code comprising:
instructions to transmit the virtual disks of the first virtual machine to the second server, wherein each transmitted virtual disk corresponds to one of the plurality of virtual disks of a second virtual machine, and wherein the virtual disks of the first virtual machine have a first format and the virtual disks of the second virtual machine have a second format, wherein a hypervisor of a first type is installed in the first server to support execution of the first virtual machine and a hypervisor of a second type is installed in the second server to support execution of the second virtual machine;

instructions to capture a plurality of updates to the files in the first storage unit corresponding to the virtual disks of the first virtual machine subsequent to the transmission of the virtual disks of the first virtual machine;

instructions to select updates caused by guest applications or guest operating system running within the first virtual machine from the plurality of updates while filtering out updates corresponding to metadata region of the virtual disks of the first virtual machine, wherein the metadata region contains format information of the virtual disks of the first virtual machine that is accessed and understood by the hypervisor of the first type and not by the hypervisor of the second type;

instructions to identify contiguous data blocks in the virtual disks of the first virtual machine that are subject to the selected updates; and instructions to transmit the identified contiguous data blocks to the second server for storage in the virtual disks of the second virtual machine.

10. The non-transitory computer-readable medium of claim 9, wherein each update comprises a file identifier, a block offset, and a number of updated blocks.

11. The non-transitory computer-readable medium of claim 10, wherein each of the plurality of virtual disks of the first virtual machine stored as files includes the metadata region and a user data region.

12. The non-transitory computer-readable medium of claim 11, wherein the captured updates are each an update of the user data region of the file corresponding to the virtual disk being updated.

13. The non-transitory computer-readable medium of claim 9, wherein the instructions further comprise:
instructions to build a transmit list comprising one or more transmission blocks, wherein each transmission block comprises a plurality of the identified contiguous data blocks.

14. The non-transitory computer-readable medium of claim 13, wherein the instructions further comprise:
instructions to determine that two or more of the updates are overlapping updates; and
instructions to create a transmission block that comprises the all of the data blocks corresponding to one of the updates and part of the data blocks corresponding to another one of the updates.

15. The non-transitory computer-readable medium of claim 9, further comprising:
instructions to take a snapshot of a plurality of storage units connected to the first server prior to said transmitting, wherein the identified contiguous data blocks are retrieved based on the snapshot.

16. The non-transitory computer-readable medium of claim 9, further comprising:
instructions to determine that execution of the first virtual machine in the first server is to be halted;
instructions to halt execution of the first virtual machine in the first server; and
instructions to start execution of the second virtual machine in the second server, the second virtual machine being a replicated version of the first virtual machine.

17. A virtualized computing system configured to replicate virtual machines, comprising:

a first computer server connected to a first storage unit, wherein the first computer server has executing therein a first virtual machine with a plurality of virtual disks stored as files in the first storage unit;

a second computer server connected to a second storage unit, wherein the second computer server includes a second virtual machine with a plurality of virtual disks stored as files in the second storage unit;

a management server; and a network that connects the first computer server, the second computer server, and the management server, wherein the virtualized computing system is configured to:

transmit virtual disks of the first virtual machine executing on the first computer server to the second server, wherein each transmitted virtual disk corresponds to one of the plurality of virtual disks of the second virtual machine, and wherein the virtual disks of the first virtual machine have a first format and the virtual disks of the second virtual machine have a second format, wherein a hypervisor of the first type is installed in the first server to support execution of the first virtual machine and a hypervisor of a second type is installed in the second server to support execution of the second virtual machine;

capture a plurality of updates to the files of the first storage unit corresponding to the virtual disks of the first virtual machine subsequent to the transmission of the virtual disks of the first virtual machine;

select updates caused by guest applications or guest operating system running within the first virtual machine from the plurality of updates while filtering out updates corresponding to metadata region of the virtual disks of the first virtual machine, wherein the metadata region contains format information of the virtual disks of the first virtual machine that is accessed and understood by the hypervisor of the first type and not by the hypervisor of the second type;

identify contiguous data blocks in the virtual disks of the first virtual machine that are subject to the selected updates; and transmit the identified contiguous data blocks to the second server for storage in the virtual disks of the second virtual machine.

18. The system of claim 17, wherein each update comprises a file identifier, a block offset, and a number of updated blocks.

19. The system of claim 17, wherein each of the plurality of virtual disks of the first virtual machine is stored as files that include a metadata region and a user data region.

20. The system of claim 17, wherein the captured updates are each an update to the user data region of the file corresponding to the virtual disk being updated.

* * * * *